United States Patent [19]

Schilling et al.

[11] Patent Number: 5,723,918

[45] Date of Patent: Mar. 3, 1998

[54] BI-DIRECTIONAL ACTUATOR USING A RANDOM DIRECTION AC MOTOR

[75] Inventors: Roger A. Schilling; Tom A. Heckathorne, both of New Brighton; Edward L. Schwarz, Minneapolis, all of Minn.

[73] Assignee: Honeywell Inc., Minneapolis, Minn.

[21] Appl. No.: 611,603

[22] Filed: Mar. 8, 1996

[51] Int. Cl.$^6$ .............................. H02K 33/14; H02P 6/00
[52] U.S. Cl. ................................ 310/37; 318/282
[58] Field of Search .......................... 310/36, 37, 39, 310/68 R; 318/280, 281, 282, 284, 286, 296, 300, 466, 467, 468

[56] References Cited

U.S. PATENT DOCUMENTS

| | | | |
|---|---|---|---|
| 2,454,832 | 11/1948 | Paulus | 318/282 |
| 2,935,877 | 5/1960 | Sealey | 318/468 |
| 3,216,226 | 11/1965 | Alger et al. | 310/39 |
| 3,295,038 | 12/1966 | Trottman | 318/282 |
| 3,530,266 | 9/1970 | Aubrey | 318/282 |
| 3,601,675 | 8/1971 | Radtke | 318/284 |
| 3,774,093 | 11/1973 | Harken et al. | 318/282 |
| 3,808,484 | 4/1974 | Trotta | 318/282 |
| 3,825,809 | 7/1974 | Gatland et al. | 318/282 |
| 3,914,676 | 10/1975 | Madonian et al. | 318/467 |
| 4,016,439 | 4/1977 | Sheridan | 310/39 |
| 4,315,170 | 2/1982 | Penn | 310/39 |

*Primary Examiner*—Clayton E. LaBalle
*Attorney, Agent, or Firm*—Edward L. Schwarz

[57] ABSTRACT

An actuator uses an AC motor assembly having a random chance of rotating in either direction upon stalling or first receiving power, to provide torque for operating its output member. The output member operates from one extreme position to another. Limit stops prevent the output member from moving past each extreme position. There is a limit switch which removes power from the motor assembly while the output member is at an extreme position. A startup switch supplies power to the motor assembly at each extreme position when the output member is to be driven to the other extreme position.

17 Claims, 3 Drawing Sheets

BI-DIRECTIONAL ACTUATOR USING A RANDOM DIRECTION AC MOTOR

BACKGROUND OF THE INVENTION

Electro-mechanical actuators are used in a wide number of different applications for operating mechanical loads. examples are valves, dampers, and doors. In these applications, the load is typically very high and the operating speed is very low, in the fractions of an RPM or a meter per minute. In certain of these applications, it is required to operate the load between two extreme positions. For example, the state of many types of valves and dampers is either completely open or completely closed, except of course for the time when they are in transition between their extreme positions. There are also actuators which can be driven to and held at virtually any position between their extreme positions.

Actuators may be classified in a number of different ways besides the two position and variable position types just mentioned. One classification is based on the type of output. A linear actuator provides high straight line force. A rotary actuator provides slow speed, high torque rotational output. The type of load involved, space and mounting considerations, cost, and operating lifetime are some of the factors on which selection of a linear versus a rotary actuator is based. By use of an appropriate linkage, a linear actuator's output can be converted to a rotary output and vice versa. In fact, many actuators now always use a conventional electrical motor and a reduction gear train whose output is rotary to a shaft to which an arm for linear actuation may be attached. The remainder of this disclosure focuses on rotary actuators. Note that for purposes of usage, there is little to distinguish one type from the other.

Another classification is based on the way in which reversibility between the two extreme positions is achieved. One can use a linkage which completes an open-closed cycle during one-half or one output shaft rotation. Or one can use a reversible motor to drive from one extreme position to another.

The electrical motors which are used can be of a number of different types. DC motors have the advantage of being relatively easily reversible and having good starting torque. On the other hand, their operating life may be shorter than AC motors, and they are certainly more expensive, not least because they require a DC power supply. AC motors are much cheaper, but including a selectable reversing function in an AC motor adds cost.

With respect to AC motors, it has been known for some time that they can be designed to have random rotational direction on startup, with an approximate 50—50 probability of startup in a particular direction being typical. Hereafter this characteristic of a motor for random rotational direction on startup will be referred to by the shorthand term "random direction". We believe random direction arises from small variations in the rotor's final rest position. Random direction has for the most part in the past been viewed as an inconvenience which motor designs try to avoid. Predetermining the startup direction can be accomplished magnetically by proper stator pole design, electrically by proper phasing of the current peaks in the stator windings, or mechanically by restricting the rotor to rotation in the desired direction. Random direction can be made tolerable in some situations by designing a load to permit the actuator to drive through one-half or one revolution during a complete operating cycle.

BRIEF DESCRIPTION OF THE INVENTION

The actuator to be described uses a motor with random direction. We have determined that when a random direction AC motor stalls while rotating in a particular direction, each half cycle of the AC wave after motor stall has an approximately equal chance of reversing motor rotation. Apparently, each zero crossing by the AC wave corresponds to a restart attempt by the motor, and if the restart direction is opposite to the direction in which the stall occurred, then the motor will reverse. The invention takes advantage of the random direction characteristic of an AC motor to automatically reverse the direction of motion of an actuator when the operating mode is from one extreme position to another.

A bi-directional AC motor-powered actuator operates on the random direction characteristic to provide its bi-directionality. The actuator receives AC power from a source allowing it to drive a load between two extreme positions. This actuator comprises a random direction AC motor assembly mounted on a frame. Typically, the motor assembly comprises an AC motor with the random direction characteristic, which drives through a reduction gear train to provide a relatively slowly moving output, say on the order of one RPM. The motor assembly has first and second power terminals for connection to receive AC power, and an output member mechanically moving between first and second extreme positions responsive to AC power applied to the power terminals. The output member provides torque to the load.

There is a first limit stop means for limiting the output member's movement away from the second extreme position and substantially prevents output member movement past the first extreme position. A second limit stop means limits the output member's movement away from the first extreme position and substantially prevents output member movement past the second extreme position. The assembly further includes at least one limit switch having a first terminal connected to the motor's first power terminal, a second terminal for connection to receive AC power, and an operating element cooperating with the output member to open the switch when the output member is near an extreme position. A normally open momentary contact switch has power terminals connected in parallel with the limit switch power terminals.

In operation, when AC power is applied to the actuator power terminals the operation of the actuator depends on the position of the motor assembly's output member. During normal operation, the output member will be near either the first or second extreme position, and the limit switch will be open. Accordingly, no power can flow to the motor assembly. Operation of the actuator starts when the momentary contact switch is closed. Power flows to the motor assembly, which starts the output member moving either closer to or away from the first extreme position. Typically the motor assembly will not have previously driven the output member into its stalled position against the first limit stop (because the limit switch opened before the output member reached the limit stop). If for example the output member starts moving closer to the first extreme position, this will continue until the output member is stalled by the first limit stop. Once stalled, the motor assembly continues to receive AC power comprising one or more AC cycles, any of which may cause the output member's direction of movement to change. If the odds are say, 50% that the output member direction of movement will change at each cycle, one can see that the odds are overwhelming that within 10 to 20 cycles the motor assembly will in fact have reversed its direction and started moving toward the second extreme position.

Once the motor assembly and its output member start their reversed travel toward the second extreme position and the limit switch closes, the momentary contact switch can be released. Current continues to flow through the limit switch to the motor assembly, and the reversed direction of output member movement continues until one of two events happen. If the motor assembly is stalled by the load at some point in the travel from the first extreme position and toward the second extreme position, the motor assembly will again reverse and cause the output member to travel toward the first extreme position. This is an unusual situation, and proper design of the actuator and its load will prevent this event. In almost every case the output member will approach its second extreme position where the output member opens the limit switch. The cooperation between the output member and the limit switch must be such that the limit switch opens before the second limit stop is reached, which could start the output member moving back toward the first extreme position.

The actuator will remain near the second extreme position with the limit switch open until the momentary contact switch is again closed. When the momentary contact switch is closed with the output member near the second extreme position, the motor assembly will again start driving the output member in one or the other of the two directions. If toward the second limit stop, the output member will again stall until the motor assembly changes direction of movement, at which time the output member will move away from the second extreme position and toward the first extreme position. One can see that the actuator can be caused to operate from one extreme position to another each time the momentary contact switch is held closed until the output member starts moving away from the closer extreme position.

There are a number of variations on this simplified version of the invention. By the use of a single pole double throw (SPDT) switch which replaces the momentary contact switch, it is possible to designate by the SPDT switch setting, which extreme position the output member assumes. The SPDT switch may comprise the contacts of a relay.

The output member can operate the limit switch in a number of ways including magnetically where the limit switch comprises a magnetically operable switch such as a reed switch, and of course mechanicaly.

The limit stops may be elements of the actuator, and if so may even comprise a part of the limit switch or switches. The limit stops function may also be inherent in the load whose position is controlled by the actuator.

DESCRIPTION OF THE EMBODIMENTS

Preferred Embodiment

Figure 1:
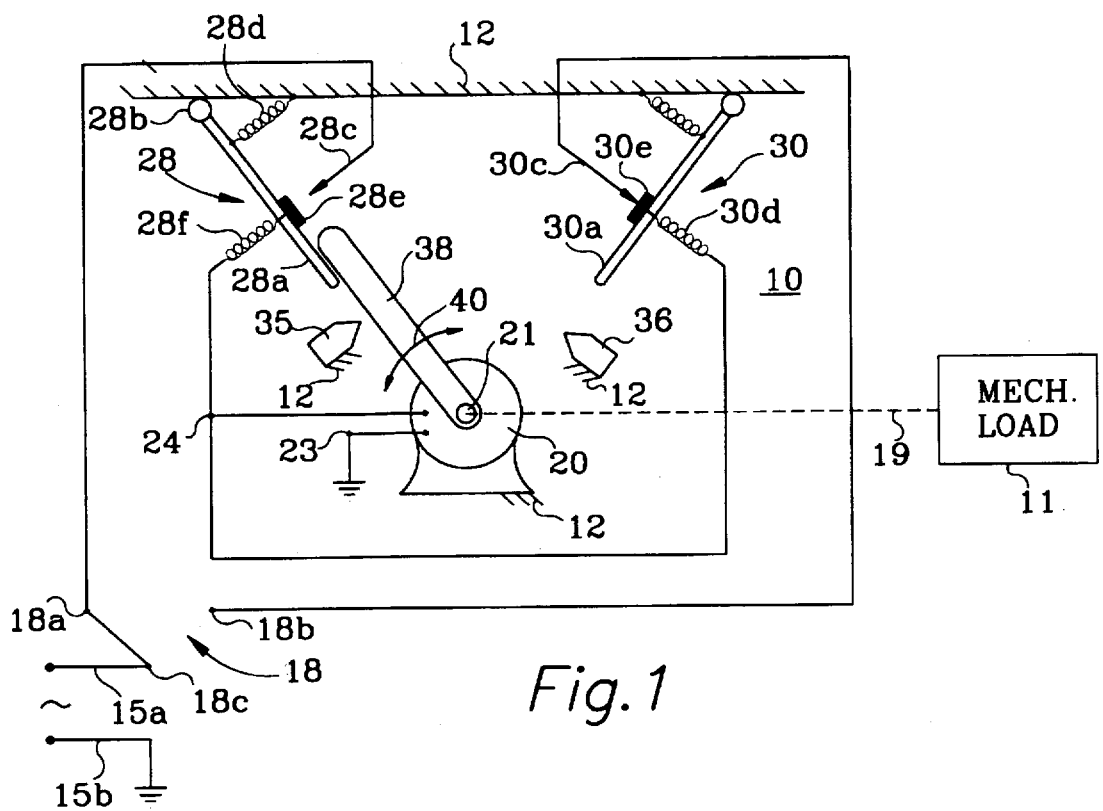
FIG. 1 is a mechanical diagram of a preferred embodiment of the invention.

In the preferred embodiment shown in FIGS. 1, 2a, 2b, and 3, the actuator 10 therein can be used to operate a mechanical load 11 of some type which must be usually operated between two extreme positions of some type. Typical loads might be a fluid valve, damper, door, or window drapes. In FIG. 1 an linkage 19 whose details are unspecified transmits mechanical force or torque from actuator 10 to load 11. The actuator 10 here is in fact intended for controlling the position of a flue damper in a furnace to prevent warm air from escaping through the chimney when the furnace is off. It is important that fuel flow and combustion occur only when the damper, whose position the actuator 10 controls, is fully open. There are many other types of loads as well whose position or operation must be controlled with great reliability.

The actuator 10 operates on AC power provided at power terminals 15a and 15b. In this embodiment, all of the actuator 10 components are mounted on a frame 12 shown only symbolically in FIG. 1. A motor assembly 20 is mounted on the frame 12 and receives AC power at power terminals 23 and 24. Motor assembly 20 will typically comprise a reduction gear train having a ratio on the order of several 1000 to one. The gear train is driven by an AC motor whose normal speed is several 1000 RPM, so the output speed at shaft 20 of motor assembly 20 may be on the order of one RPM. An important feature of the AC motor and hence of motor assembly 20, defined earlier as "random direction", is that when the motor assembly 20 is stopped (either unpowered or stalled) it becomes impossible to predict with any certainty the direction in which assembly 20 will attempt to turn during the next AC power cycle. This is not a typical characteristic of commercially available AC motors, and indeed, it was necessary to specially order the AC motors for the first embodiments of assembly 20. The random direction characteristic is in fact inherent in both induction and synchronous AC motors unless design precautions are taken (almost always the case) to insure rotation in a prearranged direction. It is preferable that the motor assembly 20 in this invention have approximately a 50% chance of starting in either direction at each crossing of the zero volt level by the AC power wave. This will prevent potentially longer waits for operation at one extreme position than the other.

Motor assembly 20 includes an output member shown in FIG. 1 as comprising an output shaft 21 carrying the last gear in the reduction gear train and an arm 38 serving as an output member fastened to output shaft 21. The linkage 19 by which actuator 10 is connected to the load 11, is shown as attached to shaft 21, but may as easily be attached to arm 38. Arm 38 (and shaft 21) have first and second extreme positions corresponding to different angular orientations delimited by limit stops 35 and 36 for arm 38. Arm 38 is shown near its first extreme position in FIG. 1 with arm 38 nearly restrained from further counterclockwise rotation by a limit stop 35. First and second limit stops 35 and 36 are mounted on frame 12 in positions which prevent rotation of arm 38 past the two extreme positions. Thus, arm 38 is constrained to rotate only between the first and second extreme positions.

There are first and second limit switches 28 and 30 mounted on frame 12 which control current flow to motor assembly 20. Limit switches 28 and 30 are shown in sketch form with each of their elements illustrated. Taking switch 28 as an example, there is an operating element 28a mounted for rotation on frame 12. Operating element 28a carries a movable contact 28e to which is attached an electrical connection 28f. A spring 28d applies force to operating element 28a urging movable contact 28e toward fixed contact 28c. Switch 28 is thus normally closed although shown as open in FIG. 1 due to actuation into the open state by arm 38. Switch 30 is shown in its normally closed state. The movable contacts 28e and 30e are both connected to motor assembly power terminal 24.

The position of actuator 10's output member, shaft 21, is controlled by single pole double throw (SPDT) position control switch 18. Switch 18 includes a common terminal 18c connected to AC power terminal 15a and first and second selectable terminals 18a and 18b respectively. Terminal 18a is connected to limit switch terminal 28c and terminal 18b is connected to limit switch terminal 30c. When switch 18 connects terminal 18a and 18c as shown, power is provided to limit switch terminal 28c. Since switch 28 is held open by arm 38, no power is supplied to motor assembly 20, and shaft 21 is stationary. It is possible to substitute a relay for switch 18, and this will be shown in more detail in FIG. 3.

At some point switch 18 may be shifted so that terminal 18b is connected to terminal 18c. Current now flows to motor assembly 20 through switch 18 and normally closed switch 30. Motor assembly 20 starts rotating shaft 21 in either a clockwise or counterclockwise direction. If in a clockwise direction, uninterrupted rotation continues until arm 38 contacts operating element 30a and opens switch 30. When switch 30 opens, power to motor assembly 20 is interrupted and shaft 21 becomes stationary. If shaft 38 starts rotating in a counterclockwise direction from the position shown in FIG. 1, arm 38 rotates counterclockwise until encountering limit stop 35. Limit stop 35 stalls shaft 21. Each half cycle of AC power applied to motor assembly 20 will attempt to rotate shaft 20 in either the clockwise or the counterclockwise direction. If the attempt is counterclockwise, no further rotation will occur because arm 38 and limit stop 35 cooperate to stall shaft 21. If clockwise, rotation will continue until finally arm 38 causes switch 30 to open as explained above. With a probability of 50% that shaft 21 will start clockwise rotation after each half cycle, it is clear that the probability that motor assembly 20 will remain in a stalled condition with arm 38 against limit stop 35 for only a few tenths of a second in the very worst case. For example, the odds that motor assembly 20 will remain stalled for half a second are 1 in $2^{61}-1$, a very small likelihood indeed! These odds arise from the cumulative chance that the same 50—50 odds event will occur 60 consecutive times. It is unlikely that actuator 10 will remain in a stalled condition for more than a few cycles for the same reason that a sequence of coin flips resulting in a large number of consecutive tails is very rare. Since the types of system which employs actuators of this type are typically very tolerant of uncertainty in actuator operating time, this is an inconsequential feature.

Once arm 38 has reached the new position near its second extreme position with switch 30 open, shaft 21 will not again move until the position of switch 18 is changed. When switch 18 is moved back to the position shown in FIG. 1, then motor assembly 20 will again either immediately begin to rotate back to the first extreme position or will rotate into a position where it stalls against limit stop 36 until a further AC half cycle starts counterclockwise rotation.

Figure 2A:
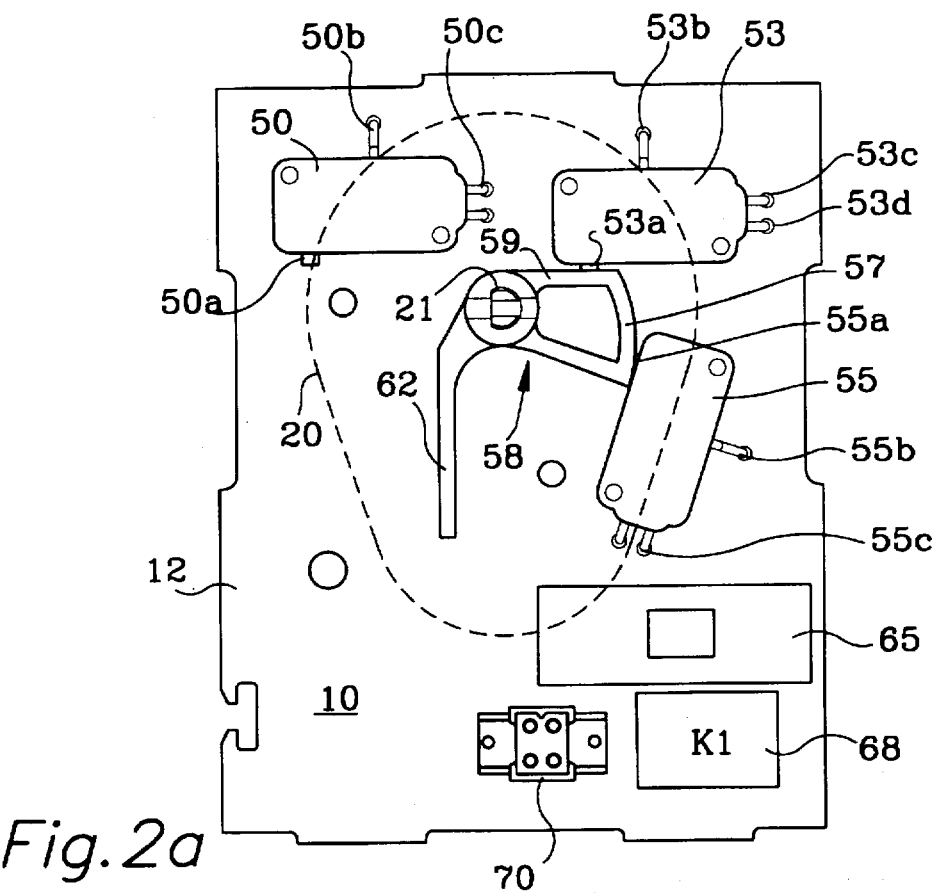
FIGS. 2a and 2b are respectively plan and perspective views of a preferred embodiment of the invention.
Figure 2B:
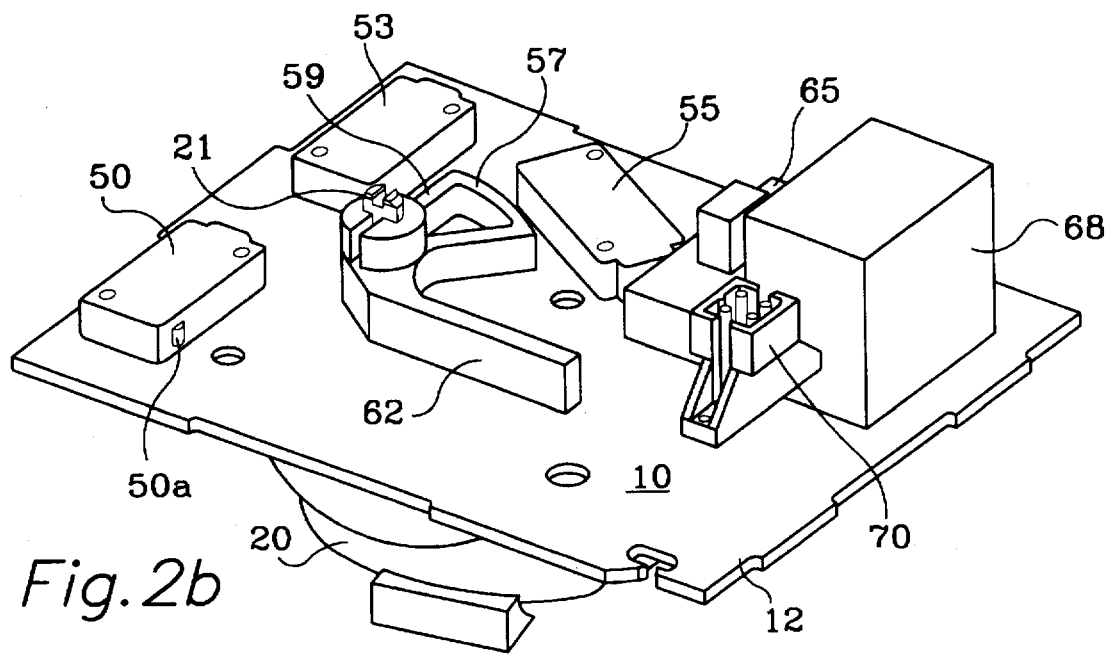

FIGS. 2a and 2b show the part of a commercial actuator device 10 which actually embodies the circuit of FIG. 1. In FIG. 2a motor assembly 20 is shown in dotted outline and mounted to frame 12. Motor assembly 20 has a shaft 21 carrying an arm assembly 58 which replaces arm 38 of FIG. 1 for the purposes of operating the limit switches. Arm assembly 58 as shown has a more complex structure which provides more functionality than does arm 38 of FIG. 1.

Shaft 21 and arm assembly 58 together comprise an output member for device 10. Arm assembly 58 includes a first arm 59, a camming surface 57 integral with arm 59, and a second arm 62. Switch 53 functionally corresponds to both switch 28 and limit stop 35 of FIG. 1 in that switch 53 both electrically and mechanically limits counterclockwise rotation of arm 58 and shaft 21. Switch 50 functionally corresponds to both switch 30 and limit stop 36 of FIG. 1 in that switch 50 both electrically and mechanically limits clockwise rotation of arm 58 and shaft 21. In the device of FIGS. 2a and 2b, switches 50 and 53 serve as both limit switches 28 and 30 and limit stops 35 and 36 respectively. Arm 62 cooperates and interacts with switch 50 to limit clockwise rotation of shaft 21 as seen in FIGS. 2a and 2b. The greatest counterclockwise rotation possible for arm assembly 58 corresponds to a first extreme position thereof. Arm 59 cooperates and interacts with switch 53 to limit counterclockwise rotation. The greatest clockwise rotation possible for arm assembly 58 corresponds to a second extreme position thereof.

Switch 50 is normally closed, allowing electrical conduction between terminals 50b and 50c. An operating element 50a controls the conduction state of switch 50. When operating element 50a is depressed, electrical conduction between terminals 50b and 50c ceases. The additional switch terminal shown below terminal 50c is not relevant to this invention. Switch 53 has a common terminal 53b, a normally closed terminal 53c with respect to terminal 53b, and a normally open terminal 53d with respect to terminal 53b. An operating element 53a controls the conduction state of switch 53. When operating element 53a is depressed, electrical conduction between terminals 53b and 53c ceases and electrical conduction between terminals 53b and 53d begins.

FIGS. 2a and 2b further include a number of other elements not strictly necessary for implementing the invention but which will be briefly mentioned for completeness' sake. A connector plug 70 allows electrical connection of the actuator 10 to a power source and to receive a control signal. A switch 65 allows an installer or maintenance person to switch from an automatic to a manual operating mode for troubleshooting of the system.

A K1 relay 68 replaces position control switch 18 of FIG. 1. Relay 68 will be mentioned in more detail in connection with the circuit diagram of FIGS. 2a and 2b in FIG. 3.

There is also a load position switch 55 having an operating element 55a with which camming surface 57 cooperates and interacts to control the conduction state of switch 55. Switch 55 is normally open without electrical connection between terminals 55b and 55c. Connection between terminals 55b and 55c is established by actuating operating element 55a. Operating element 55a of switch 55 is actuated by counterclockwise rotation of arm 58 which causes camming surface 57 to cooperate and interact with the operating element 55a as arm 58 nears its first extreme position.

Figure 3:
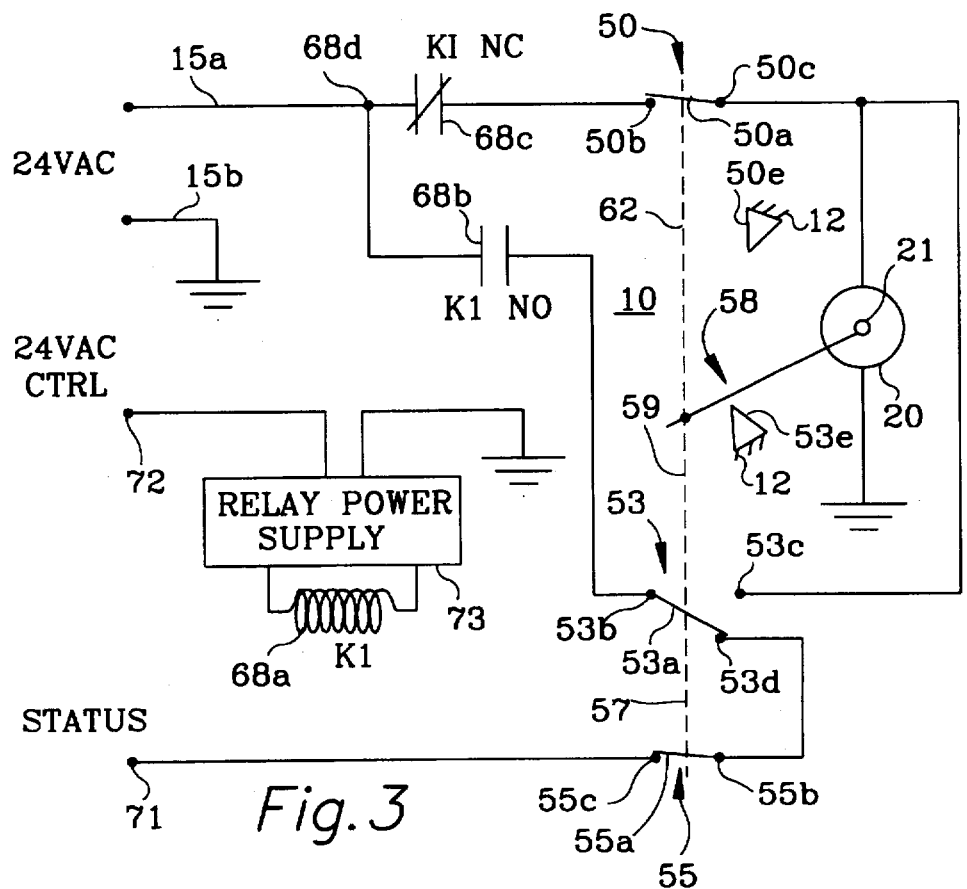
FIG. 3 is a circuit diagram of a preferred embodiment of the invention.

The operation of the version of actuator 10 shown in FIGS. 2a and 2b is best understood by reference to FIG. 3. K1 relay 68 is shown therein with a coil 68a, normally open contacts 68b, normally closed contacts 68c, and a common terminal 68d. A relay coil DC power supply 73 receives 24 V AC power from an external source when it is desired to drive actuator 10 counterclockwise toward its first extreme position. Power supply 73 may conveniently be mounted within the relay 68 housing. Power supply 73 operates K1 relay coil 68a so that when 24 V AC is present at terminal 72, coil 68a is energized and the normal conduction states of contacts 68b and 68c are reversed.

In FIG. 3, arm assembly 58 and its component elements are shown in sketch form with arm assembly 58 rotated counterclockwise to near its first extreme position. The state shown for actuator 10 corresponds to presence of 24 V AC at terminal 72 and current flowing to relay coil 68a. With power in coil 68a, NO contacts 68b are closed and NC contacts 68c are open. Limit stops 50e and 53e are indicated by their reference numbers to be a part of switches 50 and 53, and arm assembly 58 is shown rotated nearly into contact with limit stop 53e. Limit stops 50e and 53e may functionally comprise either operating elements 50a and 53a or features not specifically shown on the surfaces of switches 50 and 53. Arm 62 is shown with a symbolic mechanical connection to operating element 50a and with switch 50 closed, its normal state. Arm 59 is shown with a symbolic mechanical connection to operating element 53a and with switch 53 in its non-normal state. In the non-normal state, terminal 53b is connected to terminal 53d and terminal 53c is unconnected electrically. At the same time, switch 55 is shown placed in its non-normal, closed state by symbolically shown camming surface 57.

In this state, actuator 10 supplies 24 V AC through K1 relay contacts 68b, switch 53 terminals 53b and 53d, and switch 55 to a status terminal 71. When 24 V AC is available at terminal 71, then this provides a high level of confidence that actuator 10 is rotated counterclockwise to near its first extreme position. As mentioned earlier, the invention was originally developed to provide an inexpensive means for controlling a flue damper position. It is essential that fuel flow to the burner occurs only when the damper is open. The 24 V AC signal at status terminal 71 can only be present if arm assembly 58 has actuated switch 55 and has placed switch 53 in its non-normal state. Malfunctions by both switch 53 and switch 55 are required before a false status signal value is supplied to status terminal 71.

When power is removed from control terminal 72, contact sets 68b and 68c revert to their normal states, and power is applied to motor assembly 12 through contacts 68c and switch 50. As explained for the apparatus of FIG. 1, motor assembly 12 will either immediately start rotating clockwise toward the second extreme position where arm 59 is near limit stop 50e, or start rotating counterclockwise until arm 59 stalls against limit stop 53e. Each half cycle of AC power will provide another opportunity for motor assembly 20 to reverse direction until eventually clockwise rotation begins. As clockwise rotation of arm assembly continues, switch 53 reverts to its normal state and switch 55 opens. With further rotation of arm assembly 58, switch 50 opens and motor assembly 20 stops rotating arm assembly 58. This state of actuator 10 will persist until a control voltage is again applied to terminal 72. In this way, the position of a flue damper can be easily and safely controlled.

ALTERNATIVE EMBODIMENTS

Figure 4:
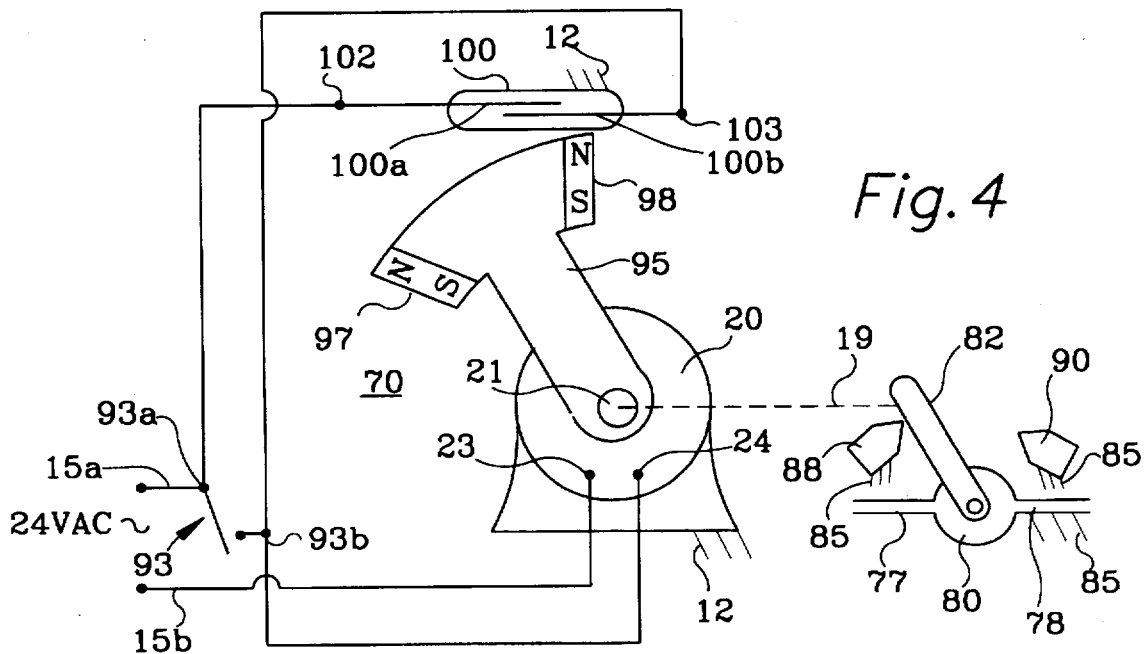
FIG. 4 is a mechanical diagram of a first alternative embodiment of the invention.

FIG. 4 shows a first alternative embodiment of this invention. An actuator 70 having this alternative embodiment is shown controlling a representative load 80 such as a fluid valve. Load 80 is shown as carried on pipes 77 and 78 which themselves are mounted on a support 85. Load 80 has an input member 82. When load 80 is embodied as a valve input member 82 will typically be a valve stem. Input member 82 rotates between a pair of limit stops shown symbolically at 88 and 90 to control the setting of the load. Limit stops 88 and 90 are shown symbolically as mounted on support 85, and typically are inherent to the operation of load 80 and its input member 82. For example, a load such as a fluid valve typically restricts rotation of its input member 82 to between full open and full closed, and mechanically opposes rotation of input member 82 outside of this range. This inherent characteristic is used in this embodiment of the invention to provide the limit stops 88 and 90 necessary to cause the direction of rotation for actuator 70 to reverse.

In actuator 70, motor assembly 20 drives an output member mounted for rotation on shaft 21, and which may be considered to comprise a control arm 95 and the linkage 19 by which actuator 70 is mechanically connected to load 80. Motor assembly 20 has the same random direction startup characteristic earlier described. The limit stops 88 and 90 within load 80 impose mechanical limits to the movement of arm 95. These limitations on movement of the output member imposed by limit stops 88 and 90 define first and second extreme positions for the output member. Actuator 70 is shown in FIG. 4 with the output member in the first extreme position. Again, motor assembly 20 provides a very low speed of rotation for its output member, such that arm 95 will typically take several tens of seconds to move from one extreme position to the other.

Arm 95 has first and second magnets 97 and 98 mounted at spaced angular positions at its end or edge. As arm 95 rotates, magnets 97 and 98 move along a path in the form of a circular arc. A magnetically actuated switch 100, typically a common reed switch, has normally closed contacts 100a and 100b respectively connected to terminals 102 and 103. Switch 100 is mounted on frame 12 in close proximity to the path along which magnets 97 and 98 move, such that when a magnet nears switch 100, contacts 100a and 100b open. Contacts 100a and 100b are shown in their non-normal state, induced by the proximity of magnet 98. Switch 100's terminal 102 is connected to actuator power terminal 15a, and terminal 103 is connected to motor assembly power terminal 24. Switch 100 and magnets 97 and 98 are designed such that a small fraction of the total angular excursion of arm 95 from one of its extreme positions toward the other is all that is necessary to change switch 100 from closed to its normally open state.

A normally open, momentary contact startup switch 93 has power terminals 93a and 93b in parallel connection with switch 100. Switch 93 controls operation of actuator 70. In the first extreme position in which actuator 70's output member is shown in FIG. 4, magnet 98 is proximate to switch 100, and holds switch 100 open. With switch 93 open, actuator 70's output member remains immobile.

When switch 93 is closed, current from AC power terminals 15a and 15b can flow directly to motor assembly 20 through switch 93. Motor assembly 20 starts arm 95 and load 80 rotating it either clockwise or counterclockwise. If clockwise, rotation of arm 95 within a second or two moves magnet out of proximity from switch 100 to a point when switch 100 closes. At this point, switch 93 may be released, since switch 100 will continue to conduct current to motor assembly 20 for driving the output member and load 80 to the second extreme position. If counterclockwise, arm 95 will rotate until motor assembly 20 stalls because load 80 reaches its limit stop 88. At this point motor assembly 20 will eventually reverse its direction of rotation due to the same reversal mechanism described in connection with FIG. 1. Because there is a slight chance that this reversal may not occur for perhaps half a second, it is necessary for switch 93 to be held closed for approximately this interval, plus the second or two necessary for arm 95 to shift magnet 98 away from switch 100 a distance sufficient for switch 100 to return to its normally closed state. Thus, switch 93 must usually be held closed for two to three seconds each time actuator 70 is to be driven from one extreme position to the other.

Switch 93 may include a delayed open function, so that once actuated, the switch may be released before switch 100 actually closes. Such an expedient is easy for those skilled in these arts to implement.

Figure 5:
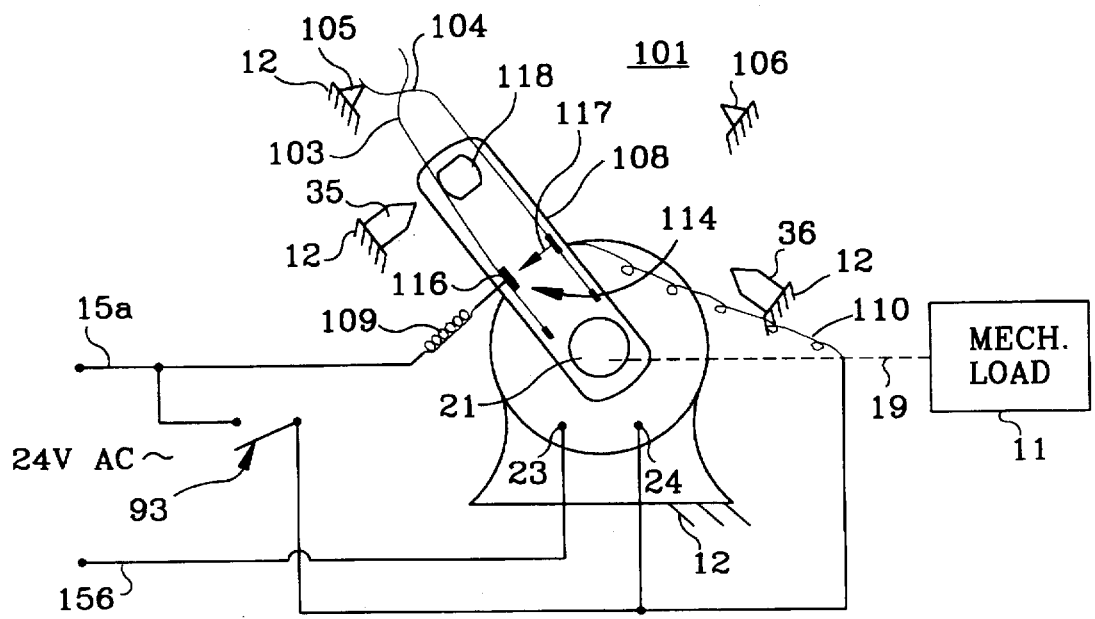
FIG. 5 is a mechanical diagram of a second alternative embodiment of the invention.

FIG. 5 shows in a conceptual presentation, yet another alternative embodiment. In this embodiment, a single normally closed limit switch 114 for motor assembly 20 power switching is carried on the output member of an actuator assembly 101. This embodiment has similarities to the embodiments shown in both FIGS. 1 and 4. Arm 108 forms a part of the output member in this embodiment, and is mounted on shaft 21 of motor assembly 20 for rotation therewith. Arm 108 is shown in FIG. 5 in its first extreme position adjacent to limit stop 35. Clockwise rotation of arm 108 brings it to its second extreme position adjacent to limit stop 36.

Switch 114 includes a pair of resilient switch arms 103 and 104 each fixed at an inner end thereof to arm 108. Each switch arm 103 and 104 also has an outer end which extends radially (with respect to shaft 21) outwardly. The outer ends of switch arms 103 and 104 cross each other so that when undeflected, each outer end is in approximate radial alignment with the main section of the other arm 103 or 104. Switch arm 103 carries a first contact 116 to which is electrically attached an extensible conductor 109 which connects contact 116 to power terminal 15a. Switch arm 104 carries a second contact 117 to which is electrically attached an extensible conductor 110 which connects contact 116 to motor terminal 24. Electrical conduction between contacts 116 and 117 occurs only through mechanical contact between them. Conductors 109 and 110 are shown only conceptually, and more likely in a commercial embodiment will comprise slip rings mounted on frame 12 and wipers carried on arm 108 rather than the extensible conductors shown.

The limit switch 114 is operated by a first switch stop 105 when arm 108 is in its first extreme position. Limit switch 114 is operated by a second switch stop 106 when arm 108 is in its first extreme position. First and second switch stops 105 and 106 are carried on frame 12 in locations allowing them to contact the outer ends of the switch arms 103 and 104 as arm 108 approaches its first and second extreme positions respectively. In the diagram of FIG. 5, switch stop 105 is shown in contact with the outer end of switch arm 104 with arm 108 in its first extreme position. In the position shown, arm 104 is deflected by stop 105 sufficiently to break connection between contacts 116 and 117. Arm stop 118 carried on the outer end of arm 108 blocks any significant clockwise (i.e., rightward) movement of arm 103 and contact 116 carried on it. When arm 108 rotates into the second extreme position, switch stop 106 contacts the outer end of arm 103 and deflects arm 103 so as to break the connection between contacts 116 and 117. In each of these cases, breaking the connection between contacts 116 and 117 stops the flow of current to motor assembly 20, halting the movement of arm 108.

The normally open momentary contact startup switch 93 is placed in parallel connection with switch 114. As with the embodiment of FIG. 4, when switch 93 is closed, power is applied to motor assembly 20 and shaft 21 starts rotating either clockwise or counterclockwise. As previously explained, motor assembly 20 will sooner or later start moving its output member from the present extreme position to the other extreme position. Similar considerations are present for operation of switch 93.

One can thus see that there are a number of different embodiments which may find a random direction motor assembly useful for reversing the position of an actuator output member.

The preceding has described our invention and a number of embodiments of it.

What we claim is:

1. A bi-directional AC motor-powered actuator to receive AC power at first and second actuator power terminals from a source and for driving a load between two extreme positions, comprising a) a frame;

b) a random direction AC motor assembly mounted on the frame, said motor assembly having first and second power terminals and an output member mechanically moving through a path of travel between first and second extreme positions responsive to AC power applied to the power terminals;

c) a first limit stop mounted on the frame, and positioned to limit the output member's movement away from the second extreme position and substantially at the first extreme position;

d) a second limit stop mounted on the frame, and positioned to limit the output member's movement away from the first extreme position and substantially at the second extreme position;

e) a first limit switch mounted on the frame, said first limit switch having a first terminal connected to the motor's first power terminal, a second terminal normally in electrical connection with the first limit switch's first terminal, and an operating element interacting with the output member to disconnect the first limit switch's first terminal from the second terminal when the output member is near the first extreme position;

f) a second limit switch mounted on the frame, said second limit switch having a first terminal connected to the motor's first power terminal, a second terminal normally in electrical connection with the second limit switch's first terminal, and an operating element interacting with the output member to disconnect the second limit switch's first terminal from the second terminal when the output member is near the second extreme position; and g) a first SPDT switch having a first selectable terminal connected to the first limit switch's first terminal, a second selectable terminal for connection to the second limit switch's first terminal, and a common terminal, said SPDT switch having a first state in which the first selectable terminal is connected to the common terminal and a second state in which the second selectable terminal is connected to the common terminal.

2. The actuator of claim 1, wherein the first stop and the first limit switch are unitary.

3. The system of claim 1, wherein the first stop and the first limit switch in combination comprise a normally closed switch enclosed within a housing mounted on the frame, said switch having its operating element and its housing mounted in the path of travel of the output member.

4. The actuator of claim 1, wherein the SPDT switch comprises the contacts of a relay.

5. The actuator of claim 1, including a load position switch having first and second terminals and an operating element for altering the conduction between the terminals responsive to actuating the operating element, said load position switch mounted on the frame with the operating element thereof in the path of the output member for actuation thereby.

6. The actuator of claim 5, wherein the load position switch is mounted on the frame with its operating element positioned for actuation as the output member nears the first extreme position.

7. The actuator of claim 6, wherein the first limit switch comprises a second SPDT switch having a common terminal connected to receive power from the first SPDT switch, a first selectable terminal connected to a motor power terminal, and a second selectable terminal, wherein the first limit switch has a normal conduction status of electrical connection between the common terminal and the first selectable terminal, and an non-normal conduction status entered when the output member operating element nears the first extreme position and while the output member has actuated the load position switch's operating element, and wherein the load position switch's first terminal is connected to the first limit switch's second selectable terminal.

8. The actuator of claim 7, wherein the output member includes a first arm, and wherein the output member's first arm contacts the first limit switch's actuation element when the output member nears its first extreme position.

9. The actuator of claim 8, wherein the output member includes a second arm, and wherein the second arm contacts the second limit switch's operating element when the output member nears its second extreme position.

10. The actuator of claim 8, wherein the first arm contacts the load position switch's operating element when the output member nears its second extreme position.

11. The actuator of claim 1, wherein the first limit switch comprises a second SPDT switch having a common terminal connected to receive power from the first SPDT switch, a first selectable terminal connected to a motor power terminal, and a second selectable terminal, wherein the first limit switch has a normal conduction status of electrical connection between the common terminal and the first selectable terminal, and an non-normal conduction status entered when the output member operating element nears the first extreme position and while the output member has actuated the load position switch's operating element.

12. A bi-directional AC motor-powered actuator to receive AC power at first and second actuator power terminals from a source and for driving a load between two extreme positions, comprising
  a) a frame;
  b) a random direction AC motor assembly mounted on the frame, said motor assembly having a first power terminal connected to the first actuator power terminal, a second power terminal, and an output member mechanically moving between first and second extreme positions responsive to AC power applied to the power terminals;
  c) a first limit stop means for limiting the output member's movement away from the second extreme position and substantially at the first extreme position;
  d) a second limit stop means for limiting the output member's movement away from the first extreme position and substantially at the second extreme position, said second limit stop means including a limit switch having a first terminal connected to the motor's first power terminal, a second terminal connected to the second actuator power terminal, and an operating element interacting with the output member to open the switch when the output member is near the second extreme position; and
  e) a normally open momentary contact switch having power terminals connected in parallel with the limit switch terminals.

13. The system of claim 12, wherein at least one of the limit stop means comprises a limit stop mounted on the frame.

14. The system of claim 12, wherein the limit switch is mounted on the output member, and wherein the limit switch's operating element comprises a lever engaging a switch stop when the output element is in an extreme position.

15. The system of claim 12, wherein the limit switch is mounted on the frame, and wherein the output member includes a feature interacting with the limit switch's operating element to open the limit switch when the output member is near an extreme position.

16. The system of claim 15, wherein the limit switch comprises a magnetically operated switch, and wherein the output member includes at least one magnet positioned on the output member to open the limit switch when the output member is near an extreme position.

17. A bi-directional AC motor-powered actuator to receive AC power at first and second actuator power terminals from a source and for driving between first and second extreme positions, a load having an input member, said load imposing on the input member an inherent limit stop at the first extreme position, said system comprising
  a) a frame;
  b) a random direction AC motor assembly mounted on the frame, said motor assembly having a first power terminal connected to the first actuator power terminal, a second power terminal, and an output member for connection to the input member, for mechanically moving the input member responsive to AC power applied to the power terminals;
  c) a limit switch having a first terminal connected to the motor's first power terminal, a second terminal connected to the second actuator power terminal, and an operating element interacting with the output member to open the switch when the output member has driven the load to near an extreme position, said limit switch comprising a normally closed magnetically operated switch mounted on the frame in proximity to the output member, and a magnet carried on the output member and positioned to open the magnetically operated switch when the load is near the first extreme position; and
  d) a momentary contact switch having its power terminals connected in parallel with the limit switch power terminals.

* * * * *